United States Patent
Ross et al.

[19]

[11] Patent Number: 5,903,653
[45] Date of Patent: May 11, 1999

[54] VEHICLE SECURITY SYSTEM

[75] Inventors: Jay B. Ross, Pennington, N.J.; Duane Sayers, La Mesa, Calif.

[73] Assignee: Remote Technologies, L.P., San Diego, Calif.

[21] Appl. No.: 08/799,004

[22] Filed: Feb. 11, 1997

[51] Int. Cl.$^6$ ...................................................... H04L 9/00
[52] U.S. Cl. ................... 380/49; 380/9; 380/21; 380/23; 380/46; 455/418; 455/419; 455/420
[58] Field of Search .................................... 380/9, 21, 23, 380/49, 50, 59, 25, 46; 340/825.31, 825.34, 825.32, 825.5, 825.54, 425.51, 426, 989, 993; 455/31.2, 31.3, 418, 419, 420

[56] References Cited

U.S. PATENT DOCUMENTS

| | | |
|---|---|---|
| 4,619,231 | 10/1986 | Stolar et al. . |
| 4,660,528 | 4/1987 | Buck . |
| 4,665,379 | 5/1987 | Howell et al. . |
| 4,884,055 | 11/1989 | Memmola . |
| 4,990,890 | 2/1991 | Newby . |
| 5,113,427 | 5/1992 | Ryoichi et al. . |
| 5,124,565 | 6/1992 | Yoshida et al. . |
| 5,129,376 | 7/1992 | Parmley . |
| 5,276,728 | 1/1994 | Pagliaroli et al. ................... 340/426 X |
| 5,479,157 | 12/1995 | Suman et al. . |
| 5,490,200 | 2/1996 | Snyder et al. . |
| 5,513,244 | 4/1996 | Joao et al. ........................ 340/425.5 X |
| 5,557,254 | 9/1996 | Johnson et al. . |
| 5,600,723 | 2/1997 | Woodall et al. ........................... 380/23 |
| 5,652,564 | 7/1997 | Winbush ................................... 340/426 |
| 5,742,227 | 4/1998 | Escareno et al. ........................ 340/426 |
| 5,815,087 | 9/1998 | Campbell et al. ................... 340/825.54 |

*Primary Examiner*—Bernarr E. Gregory
*Attorney, Agent, or Firm*—Gregory M. Howison

[57] ABSTRACT

An anti-theft system is disclosed which includes a fuel cut-off valve (12) that is controlled in response to receiving a command over a paging system utilizing a paging receiver (14). The message that is sent to the paging receiver (14) is encrypted. This encryption is performed by utilizing a first level of encryption wherein a message is generated including a secondary address, command information and a CRCC check byte. This is encrypted by utilizing an encryption table of randomly generated numbers at a central office location and then utilizing a corresponding encryption table at the receive location for the decryption operation. An index byte is utilized to determine the value selected from the encryption table at the central location which is forwarded to the receiver such that the same values are extracted from that encryption table. These values are assembled into a decryption key which is similar to the encryption key at the central office. Once decrypted, the command information must then be retrieved. The command information sent is in the form of randomly generated numbers that can be correlated with a command. This correlation is performed at the central office and then re-indexed to determine what the command was at the receiver. The CRCC check is then performed after inserting the actual command into the word.

4 Claims, 5 Drawing Sheets

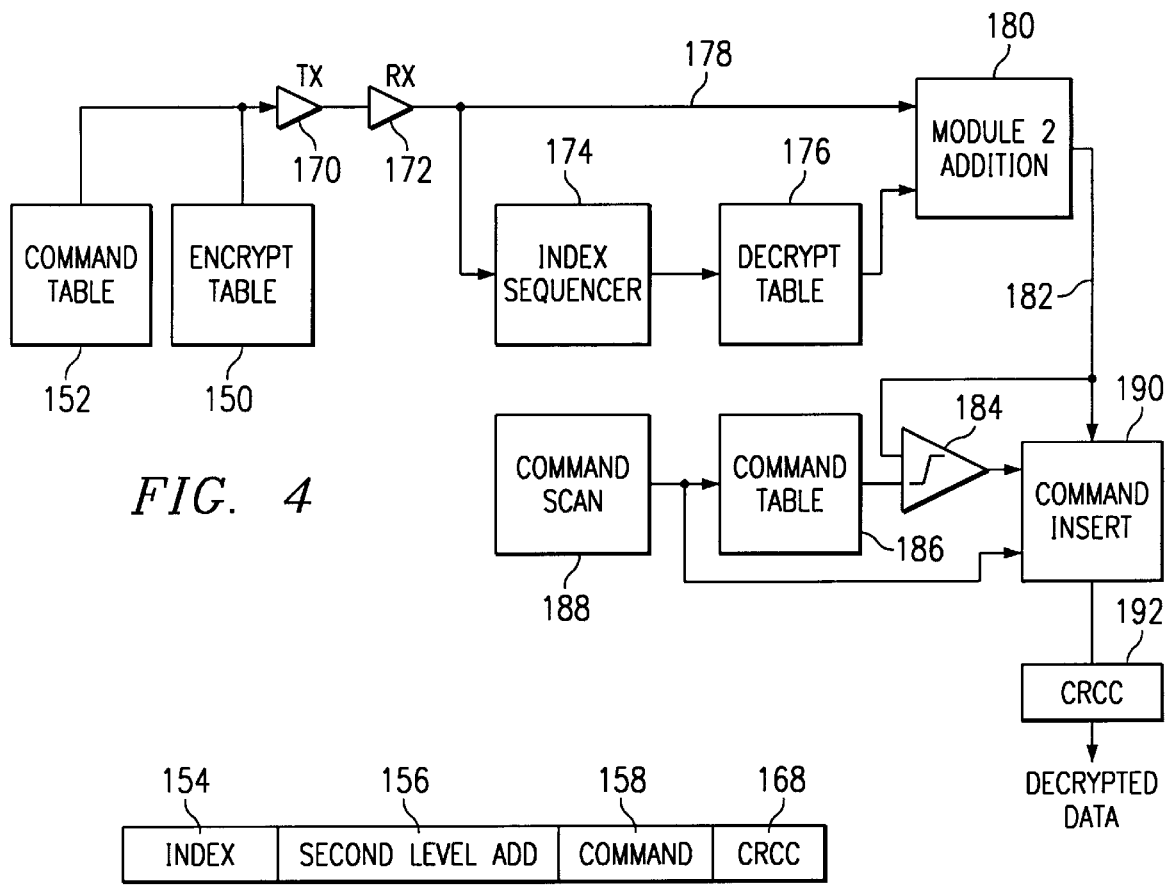
FIG. 4
| 154 | 156 | 158 | 168 |
|---|---|---|---|
| INDEX | SECOND LEVEL ADD | COMMAND | CRCC |
FIG. 5
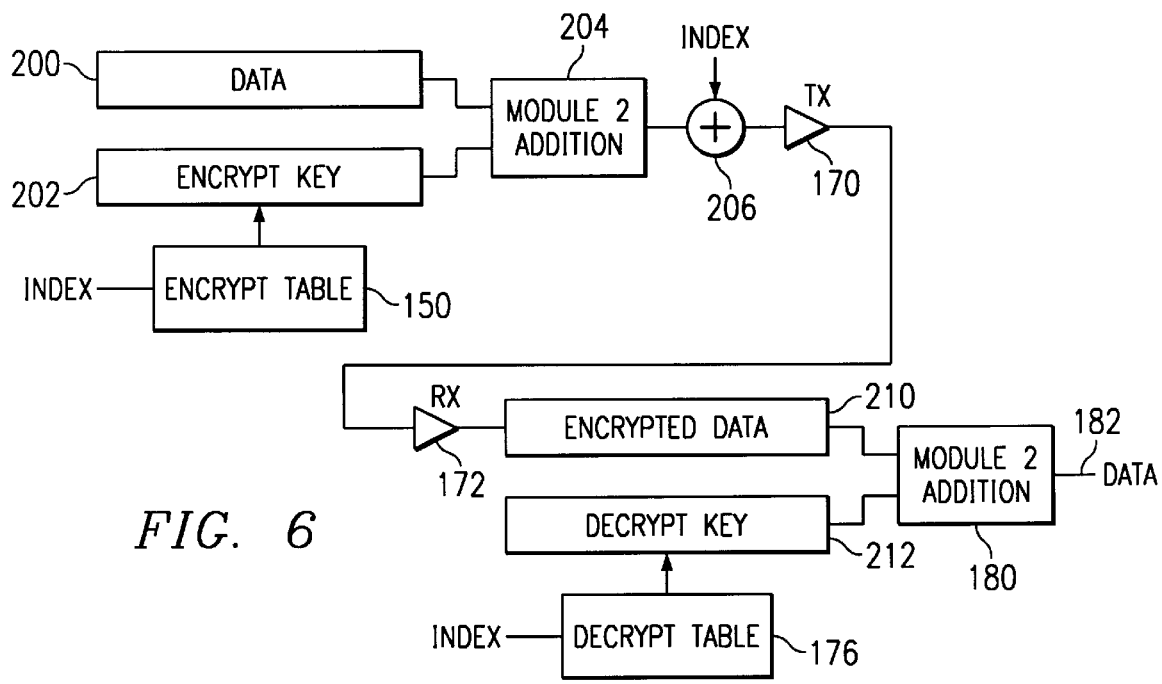
FIG. 6

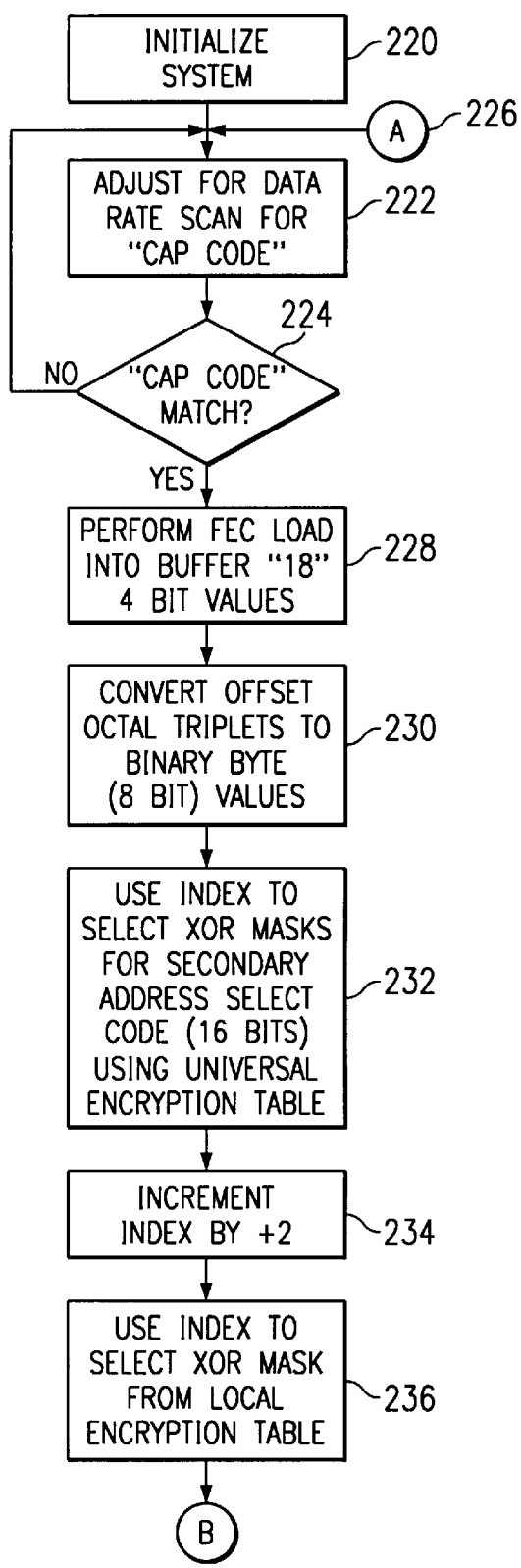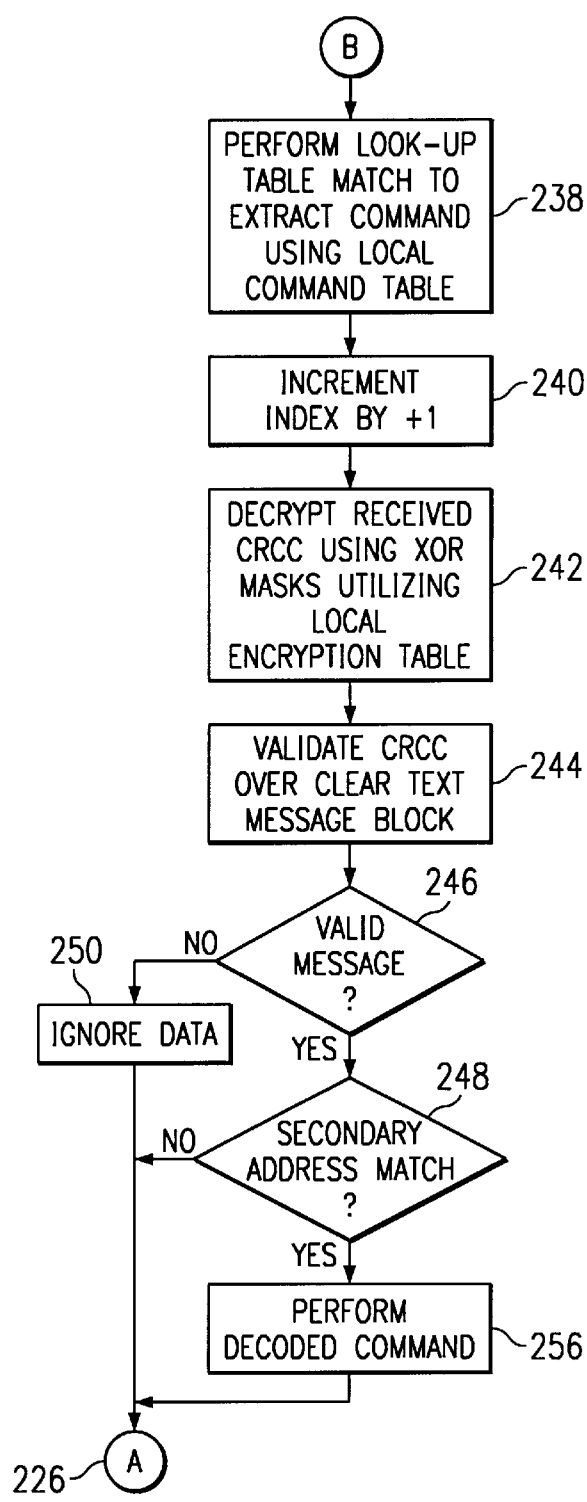

VEHICLE SECURITY SYSTEM

TECHNICAL FIELD OF THE INVENTION

The present invention pertains in general to vehicle security systems and, more particularly, to a vehicle security system that utilizes a wireless transmission path through a paging system utilizing a pager as the receiver to allow the vehicle to be disabled upon receiving a command through the paging system.

BACKGROUND OF THE INVENTION

Vehicle theft has seen a dramatic rise in the last ten to fifteen years due to the sharp increases of price in automobiles and the high cost of parts therefor. There, of course, have been many devices devised and sold to the public in an attempt to thwart auto theft. However, most of these are relatively east to circumvent. As such, it has generally been the policy of a vehicle owner to merely insure the vehicle and buy a new vehicle with the insurance money in the event of a theft. This, of course, is not an acceptable position by the insurance companies and insurance rates have subsequently risen in response to this attitude.

One system that has been developed in an attempt to decrease auto theft is an Automatic Vehicle Location (AVL) system which is essentially a triangulation system. In this system, a transmitter is disposed on each vehicle, which transmitter is a polled transmitter. This transmitter has associated therewith a polling receiver that is tuned to a fixed frequency. Each transmitter and its associated polling receiver have associated therewith a unique identification number or address on the system. When a vehicle is stolen, it is only necessary to transmit a signal out on the fixed polling frequency to all of the receivers. All of the receivers then receive this polling command and look for their address. If their address is found on the polling command, this indicates that information must be transmitted from the transmitter. The transmitter typically incorporates a unidirectional antenna that allows it to emit a radio signal in all directions. This radio signal is substantially the carrier and information is modulated onto this carrier. The transmitted information essentially contains identification information. More importantly, however, is the actual signal strength of the carrier which can be received by strategically located receivers about a given location. Only three receivers are required in order to "fix" a given location by conventional triangulation techniques.

One disadvantage to the AVL systems is that with respect to "throughput." Whenever a vehicle disappears, it is necessary to first transmit the polling command for that particular car and then wait for reception of the transmitted signal. Since there is only a single polling channel and since the strategically located receivers only have a single receive frequency different from the polling frequency, only one vehicle can be polled at a given time. If, for example, there were one hundred cars on the system that were stolen at a given time, this would require one hundred commands to be sent out in sequence, with a wait time after each command. There would then be some delay for the triangulation process, at which time the location of the vehicle would then be fixed. The problem, of course, occurs when the vehicle is moving. It can take upwards of twenty minutes to have a polling command pass through the system and then perform the triangulation operation. This is unacceptable for locating moving vehicles in real time.

Additional systems have been proposed for eliminating vehicle theft which operate by disabling the vehicle. The earliest systems of this type, of course, were those that disabled the vehicle in response to a breaking and entering of the vehicle. However, these again can be thwarted. Further, they can also fail. This has lead to user disabled systems which utilize some type of paging system that can send commands to the vehicle to alter the operation thereof and effectively stop the vehicle. These commands can be of the type that slow the vehicle down, they can be the type that turn off the ignition switch, or any type of command that is operable to affect the parameters of the vehicle. One system is that disclosed in U.S. Pat. No. 5,490,200, issued to Snyder et al. on Feb. 6, 1996.

When utilizing paging systems, there are numerous difficulties to deal with. First and foremost, paging systems are designed to transmit messages and not commands. Therefore, the transmission medium is not necessarily amenable to the transmission of commands over the paging frequencies. As such, although the paging systems do offer an attractive advantage in that they have existing infrastructures, they do have some problems that must be dealt with.

SUMMARY OF THE INVENTION

The present invention disclosed and claimed herein comprises a vehicle anti-theft system for allowing a user to disable a vehicle. The system includes a wireless transmitter that is locatable remote from the vehicle and operable to transmit one of a plurality of disable commands. A wireless receiver is provided and associated with the wireless transmitter, which receiver is fixedly disposed on the vehicle. The receiver is operable to receive the transmitted disable command and generate a control signal in response thereto. A command interpreter is operable to carry out the received command in response to the generation of the control signal. The wireless transmitter includes a transmitter encryption table for containing encryption key information unique to the vehicle and an indexer that is operable to generate an index value that defines a portion of the encryption table that is to be transmitted as a transmit key. An address generator is operable to generate an address that is associated with the transmitter encryption table for the associated vehicle. A command generator then generates one of the plurality of commands. The address and command information are then encrypted utilizing a Modulo 2 addition device to provide encrypted data, this facilitated by utilizing the transmit key. The transmitter is then operable to transmit the unencrypted index followed by the encrypted data. The receiver includes a receiver encryption table substantially identical to the transmitter encryption table. A Modulo 2 device is operable to receive the encrypted data and then decrypt this data utilizing the output of the receiver encryption table. The contents of the receiver encryption table are accessed with a receiver indexer that receives the unencrypted index and utilizes this to extract a portion of the receiver encryption table substantially identical to the portion of the transmitter encryption table that was utilized to generate the transmit key for input to the Modulo 2 device. A command interpreter is operable to execute the decrypted command and an address comparison device is then operable to compare the decrypted address with a locally stored address value that is unique to the vehicle associated with the receiver. The command interpreter is activated whenever the decrypted address corresponds to the fixed local address.

In another aspect of the present invention, the transmitter further includes a CRCC device for performing a cyclical redundancy check operation on the transmitted data prior to encryption thereof to generate CRCC check bit values associated with the data to be encrypted. These check bit values are added to the data prior to encryption and then the entire data/check bit values encrypted. The receiver includes a CRCC decoder for determining if the CRCC check bit in the encrypted data corresponds to the data portion thereof and, if not, then inhibiting the disable device from operating.

In a yet further aspect of the present invention, the command interpreter comprises a command table that is unique to the vehicle for storing a plurality of random numbers and wherein the command comprises a value that is associated with a location in the command table. The data to be encrypted has the CRCC check bit values determined by the CRCC device prior to encrypting and then the command is replaced by the random numbers associated with the location corresponding to the command in the transmit command table prior to transmission thereof The receiver includes a receiver command table substantially identical to the transmitter command table for the associated vehicle. A location device is then operable to compare the decrypted command field with the contents of the receiver command table and then determining which command corresponds to the decrypted command field and then inserting the determined command into the command field prior to processing by the CRCC decoder.

BRIEF DESCRIPTION OF THE DRAWINGS

For a more complete understanding of the present invention and the advantages thereof, reference is now made to the following description taken in conjunction with the accompanying Drawings in which:

FIG. 4 illustrates a block diagram of the encryption/decryption algorithm;

FIG. 5 illustrates a diagram of the data field;

FIG. 6 illustrates a further block diagram of the specific encryption/decryption key portion of the algorithm;

FIGS. 7 and 8 illustrate a flowchart depicting the command transmission;

DETAILED DESCRIPTION OF THE INVENTION

Figure 1:
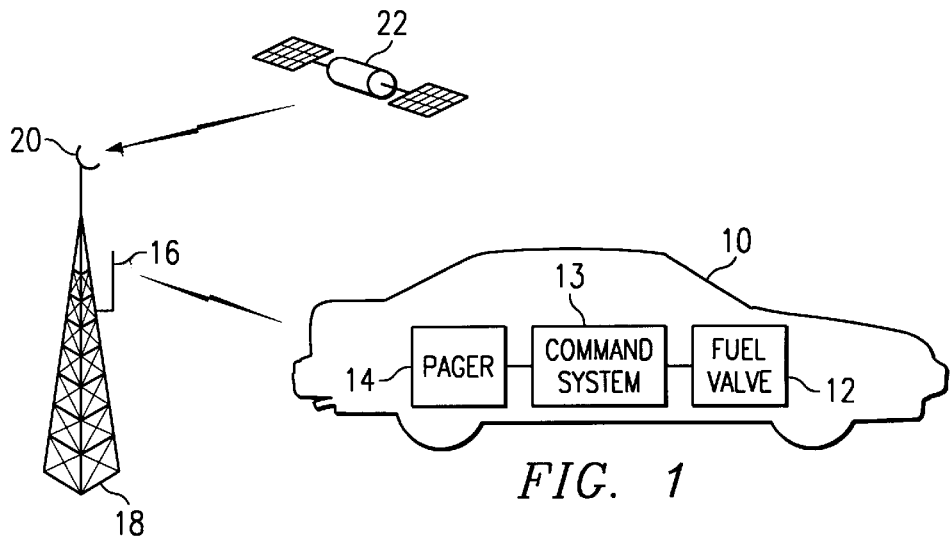
FIG. 1 illustrates an overall block diagram of the anti-theft system of the present invention.

Referring now to FIG. 1, there is illustrated a general block diagram of the overall anti-theft system. A vehicle 10 is illustrated, which vehicle 10 has associated therewith a fuel valve 12. The fuel valve 12 is operable to interrupt the flow of fuel to the vehicle 10. This interruption can either be a total interruption or it can be an intermittent interruption. Further, the fuel valve 12 can be envisioned to be a variable or restricted flow valve.

The fuel valve 12 is controlled by a command system 13 which receives commands via a paging receiver 14. The paging receiver 14 is interfaced with a paging transmitter 16 disposed on the paging tower 18 which is often referred to as a "stick." The paging tower 18 has associated therewith a satellite receiver 20 which is operable to interface with a satellite 22. In general, the paging system is a conventional paging system which is operable to receive paging messages in a conventional manner. One technique for transmitting these messages is referred to as a POCSAG format which generally involves the transmission of small packets of address and messages which are each comprised of an address portion and a data portion. The address portion of the message defines the actual address of the pager 14 with the following data being received by the pager 14 when it recognizes an address. Of course, all pagers in a system that have a receiver tuned to the paging frequency will receive all messages. Only the messages that are addressed to that pager will actually be captured and stored by the pager. Again, this is a conventional operation to receive digital information from a paging system. Of course, one of the disadvantages to any paging system is that the paging system is a single "pipe" through which all information must be transmitted in a serial manner. Therefore, if one thousand pages are sent at a single time, they must be arranged in a queue and sent out in a serial manner at the throughput rate of the paging system.

Figure 2:
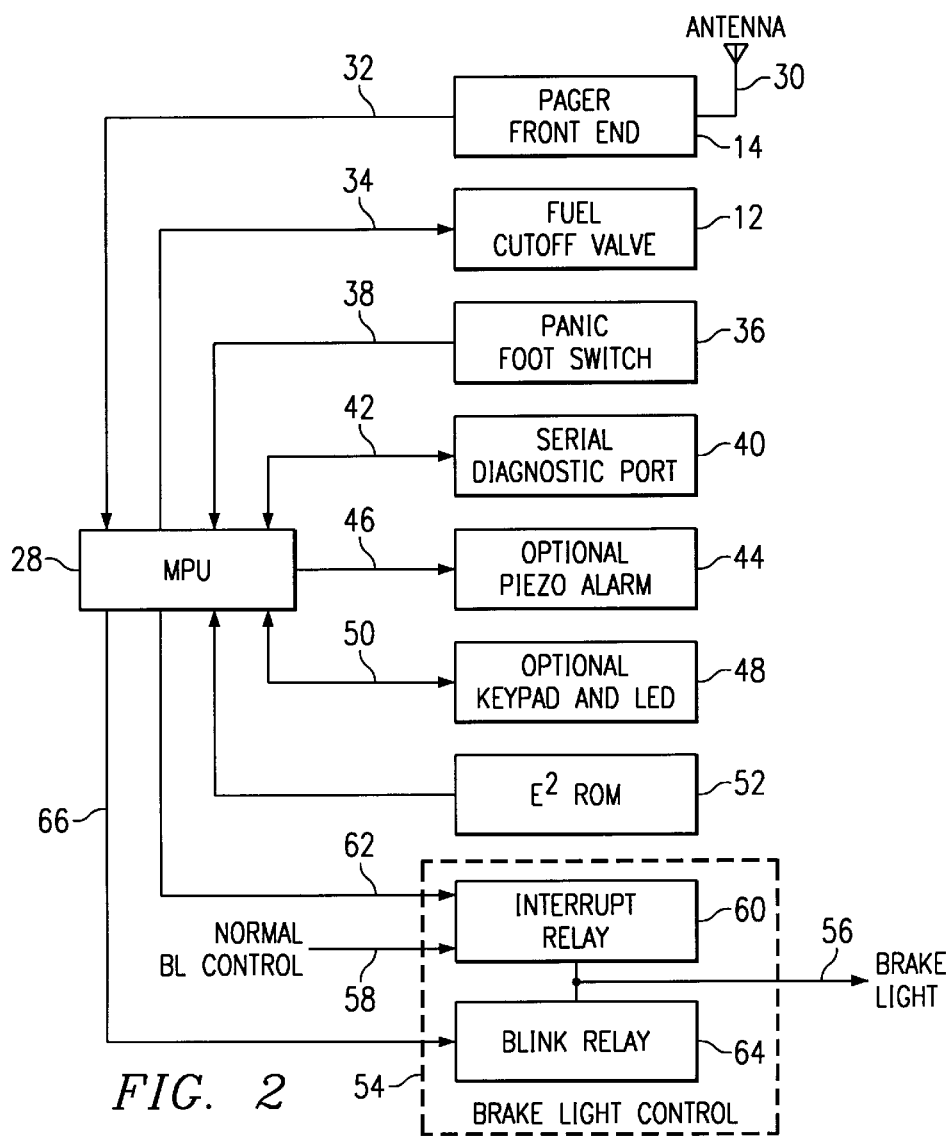
FIG. 2 illustrates a block diagram of the high level system.

Referring now to FIG. 2, there is illustrated an overall block diagram of the system. At the heart of the system is a master processing unit (MPU) 28, which receives digital data from the pager 14, which is referred to as a pager front end. The pager front end has associated therewith an antenna 30 which is operable to receive the information from the paging transmitter 16. This antenna 30 and the front end pager 14 result in a tuned input which is tuned to the specific frequency of the paging system associated with the paging transmitter 16. The pager 14 is operable to output on a line 32 digital data that is received from the paging system. The pager front end 14 is a conventional system, as described above, and outputs the digital information on the line 32 in the manner associated with a conventional pager.

The fuel valve 12 is controlled by a signal from the MPU 28 on a line 34. In addition, there is provided a panic foot switch 36 which can be operated by the user to output a signal on a line 38 to the MPU 28. There is also a provided a serial diagnostic port 40 which is a typical RS232 communication port that interfaces through an RS232 bus 42 with the MPU 28, this being a conventional serial interface. An optional piezoelectric alarm 44 is provided which receives an output signal from the MPU 28 on a line 46. There is also provided an optional keypad and LED system 48 which interfaces to the MPU 28 through a bi-directional line 50 to receive information in the form of LED signals from the MPU 28 and to input keypad information to the MPU 28. Memory is provided by a non-volatile memory 52 in the form of an EEPROM, which is a programmable non-volatile memory. This, again, is a conventional memory of any type that is programmable. There is also provided a break light control system 54 which is operable to receive signals from the MPU 28 and to control the signal to a break light through a line 56. Typically, the break light associated with the line 56 will receive an input signal on a line 58 which is the conventional break light DC voltage. This is input to an interrupt relay 60 which is disposed between the line 58 and the line 56. A control signal on a line 62 from the MPU 28 will operate the interrupt relay 60 to break the connection between the line 58 and the line 56. A blink relay 64 is then activated by the MPU 28 through a line 66 to apply a voltage to the break light line 56 to essentially indicate that the vehicle is in distress.

Figure 3:
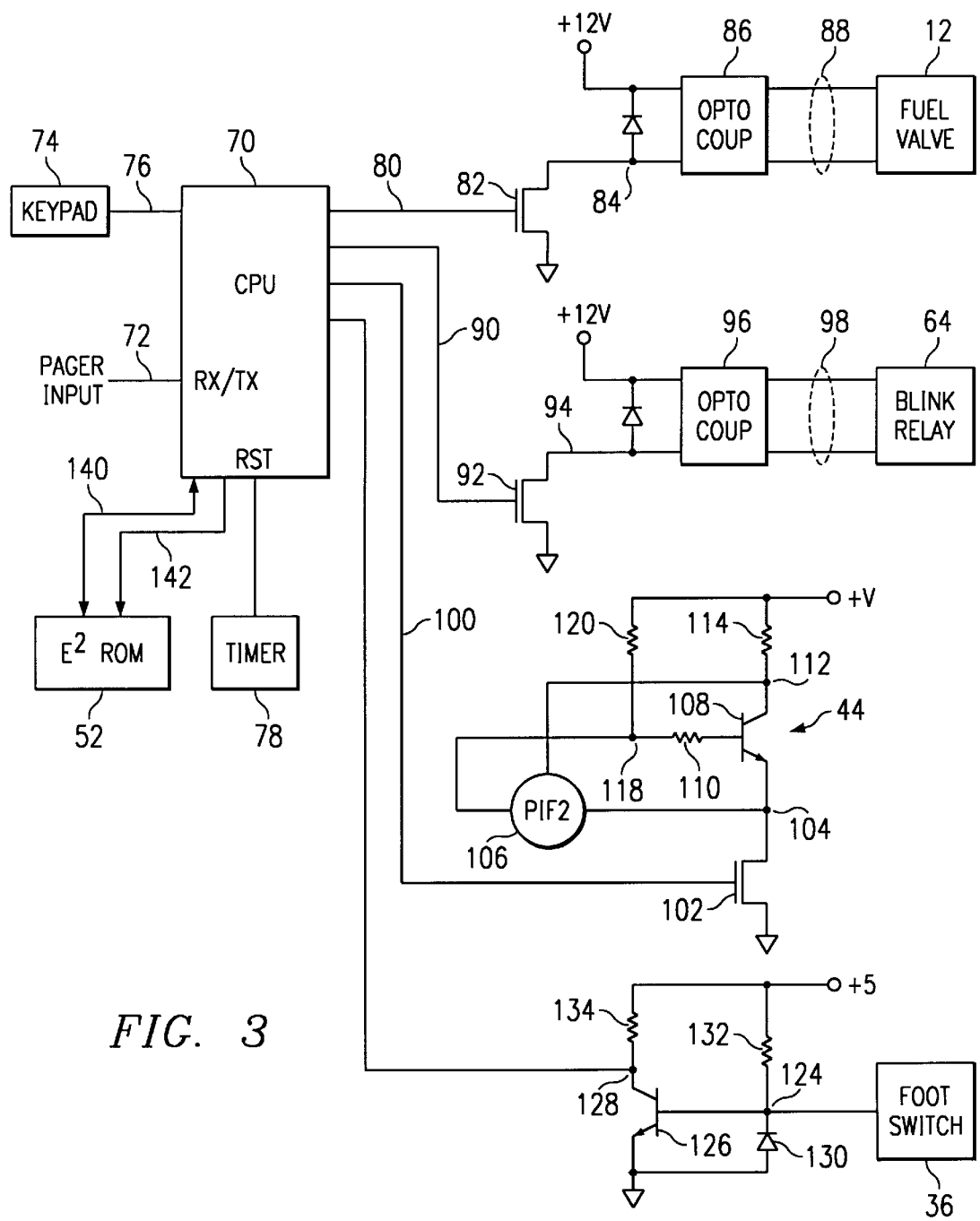
FIG. 3 illustrates a logic diagram of the MPU.

Referring now to FIG. 3, there is illustrated a more detailed block diagram of the MPU section 28. The MPU 28 in general is comprised at thereof of the central processing unit 70. The central processing unit 70 is of the type 87C52 manufactured by Phillips Semiconductor, Inc. This is a conventional microprocessor which has associated therewith a crystal (not shown) for providing timing information, and various interrupt inputs are provided. The CPU 70 is interfaced with the non-volatile memory 52 which contains state values and secondary address commands as well as keypad unlock codes. The CPU 70 is operable to receive the pager input signals on a line 72. It should be understood that, although the pager is illustrated as having a receive only paging front end, it is also possible to utilize a bi-directional pager. There are some pagers that exist that have the ability to transmit back acknowledgment signals and to transmit data back on a different frequency. It is therefore possible for the CPU 70 to provide both an input for receiving information from the pager front end and also an output for outputting transmit data information. These are generally dedicated ports that do not require an interrupt signal, as they are continuous data ports; that is, whenever data is received on the input, it will be recognized by the CPU 70. Additionally, any time that data is transmitted out to the pager, when a receive/transmit pager is utilized, this data will automatically be transmitted on that pager, since the transmit operation is not a multiplexed operation but a dedicated one.

There is provided a keypad 74 that is interfaced with the CPU 70 through a line 76. The line 76 essentially consists of transmit and receive key lines and various interrupt lines. This, again, is a conventional input to the CPU 70. The CPU 70 also has associated therewith a timer 78, which is of the type LM555, manufactured by National Semiconductor. This is a conventional timer that can be configured to generate a reset signal. This is input to the reset input of the CPU 70. The purpose of this timer is to provide a reset function of the CPU upon power up, this being a one shot.

The CPU 70 is also operable to generate the various control signals. For the control of the fuel valve 12, a signal is output on a line 80 to the gate of an N-channel transistor 82. The source/drain path thereof is connected between a node 84 and ground, node 84 connected to the input of an optocoupler 86. The optocoupler 86 is operable to optically couple the signal on the node 84 to a pair of contacts on two lines 88 which operate the fuel valve 12. In general, this is a switch that will provide a connection and short the two lines 88 together. This will then activate the fuel valve 12.

A second line 90 is provided as an output from the CPU 70 for controlling the break relay 64. This is input to the gate of an N-channel transistor 92 which has the source/drain path thereof connected between a node 94 and ground. Node 94 is connected to the input of an optocoupler 96 on one side thereof, the other side thereof connected to two lines 98 to the blink relay 64. Again, the output of optocoupler 96 is operable to short the two lines 98 whenever a node 94 is pulled to ground.

A third control line 100 is provided for the operation of the piezoelectric alarm 44. The line 100 is connected to the gate of an N-channel transistor 102, the source/drain path thereof connected between a node 104 and ground. Node 104 is connected to one side of the piezoelectric transducer 106 and also to the emitter of an NPN transistor 108. The base of transistor 108 is connected to one side of resistor 110 and the collector thereof connected to a node 112. Node 112 is connected to one side of a resistor 114, the other side thereof connected to the power supply voltage. Node 112 is also connected to the piezoelectric transducer 106, as well as the other side of resistor 110 being connected to one input of the transducer 106 on a node 118. A resistor 120 is connected between node 118 and the power supply. In the preferred embodiment, the transducer 106 is associated with the keypad.

The output of the foot switch 36 is input to a node 124, node 124 connected to the gate of an NPN transistor 126, the emitter thereof connected to ground and the collector thereof connected to a node 128 that is input to the CPU 70. A diode 130 is connected between node 124 and ground with the cathode thereof connected to node 124. A first resistor 132 is connected between node 124 and a positive 5-volt supply voltage and a second resistor 134 is connected between the node 128 and the positive 5-volt supply voltage. The 5-volt supply voltage is essentially the voltage of the CPU to ensure that the voltage applied to the CPU 70 is no greater than the power supply voltage thereof.

It should be understood that there are many operations that can be conceivably provided by the CPU 70. It is only necessary for the CPU 70 to retrieve from the memory 52 information for the decryption process and then stored in the memory associated therewith. The memory 52 is interfaced with the CPU 70 through a bi-directional data bus 140 and an address bus 142. It is possible to program the memory 52 in an initialization operation by uploading the decryption table therein, as will be described hereinbelow. Once a decryption table is loaded in the non-volatile memory 52 through the bi-directional data bus 140, the CPU 70 can then have a security bit programmed which will "lock" the information therein such that it cannot be downloaded therefrom.

Referring now to FIG. 4, there is illustrated a block diagram depicting the encryption/decryption algorithm. There is provided at the central station an encryption table 150 and a command table 152. These two tables are utilized to generate a message that is transmitted to the front end pager. The fields of this message are illustrated in FIG. 5. As noted in FIG. 5, the fields are comprised of an index field 154, a second level address field 156, a command field 158 and a CRCC field 160 associated with a cyclical redundancy check (CRC) algorithm. The index in the index field 154 is the first portion transmitted and is the initial address or location in the encryption table 150 that is utilized for the encryption operation. The encryption table 150 comprises a plurality of randomly generated values at each of 256 addressable locations. For each pager there is provided an encryption table. The encryption tables are comprised of randomly generated numbers, but it is important that there be a randomly generated encryption table for each pager, the purposes of which will be set forth herein. However, it is important that the index be transmitted without being encrypted to the pager in order to initiate the decryption process.

In order to provide a plurality of paging systems without having individual paging addresses for each pager, a second level address is provided for the anti-theft system. In this manner, all pages associated with the anti-theft system can have the same address such that only a single "cap code" need be acquired for the system. Therefore, any message sent to the pager will be received and captured by all of the pagers in the system. It is therefore necessary to provide a second level address, one associated with each pager, in the message that can be decoded to determine if the message is for that particular pager. The command table 152 includes information that is correlated to a command. As will be described hereinbelow, the command information comprises one of a plurality of locations in the command table 152. The command table 152, as with the encryption table 150, is comprised of a plurality of random numbers. For example, if one wanted to utilize command 20, then the random number stored in location 20 in the command table 152 would be transmitted in the command field 158, rather than the actual command itself. Of course, the command table 152, as was the case with the encryption table 150, is a command table generated for and unique to each pager, there being a corresponding command table in the pager.

Once the data string has been assembled, the second level address 156 and the desired command-the location 20 in the above noted example, will be assembled into a message and then a 2-byte CRCC check value generated. This system utilizes a CCITT reverse CRC-16 algorithm. The calculation includes the index byte in field 154 and the clean text values for the secondary address field 156 and the actual command that is to be executed, i.e., location 20 in the above example. Thereafter, the CRCC check value is stored in the field 168 and then the actual contents of the location 20, in the above noted example, stored in the command field 158, rather than the actual command itself, i.e., 20. This is transmitted through a transmitter 170 to a receive block 172, which is a portion of the pager 14.

When the index field 154 is received, this being the first portion that is received, the index value is stored in a block 174 and an index sequence initiated. This sequence is initiated on the decryption table 176. This operation will be described hereinbelow. The actual data on a line 178 is then input with the contents output from the decryption table 176 into a Modulo-2 addition block 180, which is an Exclusive OR operation to provide a decryption result on a line 182. At this point, if the decryption table 176 of the pager is identical to the encryption table 150 at the central office, then a decrypted signal will be present on the line 182. However, as noted above, the command information in the field 158 is not really the actual command. To determine what the actual command is, the command field 158 is compared with a comparator 184 to all of the values stored in a command table 186 corresponding to the command table 152 at the central office for that specific pager. This command table is scanned with a command scan block 188 that sequences through all of the command locations. When a match occurs, then the command location value associated with that location will be inserted into the command field 158 in place of the actual value that existed before. As noted above, the actual value that was in the field 158 at the output of the decryption Modulo 2 block 180 is a random value that was stored in a location in the command table 152. If there is a corresponding value in any of the locations in the command table 186, then the location of that command in the command table will constitute the actual command. For example, if as noted above in the example, the desired command was at location 20, a random number in that location in table 152 would have been inserted into command field 158. When this was input to the comparator 184, the command table 186 would be scanned until a corresponding value were found. When a match occurs, this indicates that this location is the actual command itself, not the value in the table. This would then be inserted as the command field 158. The purpose of this is that the CRCC check value is based upon the entire word including the index, the second level address and the actual command of, for example, 20. This command must then be inserted with an insert block 190 in the command field 158 in place of the old value and then passed to a CRCC check block 192 to determine if the CRCC value is at a value of "0." If, for some reason, the system passed through the decryption algorithm in table 176 and then happened to have a command value at a location other than 20 in the command table 186, this not really corresponding to the command table 152 associated with that pager, then the command location would be other than 20 and the CRCC check in block 192 would be in error.

This is contrary to how CRCC systems are utilized in that there is a very low probability that there will be a true comparison when there is an error.

Referring now to FIG. 6, there is illustrated a more detailed block diagram of the encryption/decryption algorithm. At the central office, the data that is to be encrypted is assembled in a block 200. This data has a defined length. The index is then utilized in the encryption table associated with the encryption table 150 associated with the pager to which the message is to be sent and this index defines a randomly generated first location. This can be any number. For example, it could be location 251 out of the 256 locations. The index would then sequence through 6 or 8, depending upon the application, locations. For example, it would output locations 251, 252, 253, 254, 255 and "0" and the information associated therewith to assemble an encryption key 202. This data 200 and the encryption key 202 would then be processed through a Modulo-2 addition block 204, similar to the Modulo-2 addition block 180 in the pager, and then be transmitted out to transmitter 170 with the addition of the index being sent out unencrypted, as indicated by a summation block 206. As such, there has been an encryption key generated with the encryption table 150 which allows data to be encrypted. The only important thing is that, with an encryption, there be an identical decryption key. This is facilitated by receiving the encrypted data, referenced by block 210 at the pager through the receiver block 172 and then providing an identical decryption key 212. This is generated by receiving the index unencrypted, which index then defines the first location in the decryption table 176 from which data is to be extracted. This data will then be extracted in the same sequence with which it was generated from the encryption table 150 to provide the decryption key 212. This decryption key 212 and the encrypted data 210 are then input to the Modulo-2 addition block 180 to provide the decrypted data on the output line 182. It is noted that the only important thing is that the encryption table 150 and the decryption table 176 be identical such that the numbers therein that are output in the sequence thereof generate the same key. Therefore, the only unencrypted information that is transmitted over the paging system is the index, and this index is a randomly generated number and has no correlation to what is either in the encryption table 150 or the decryption table 176, nor does it have any association with a particular pager since it is generated as a random number each time it is sent. Since the index for creating the encryption key 202 is the same as that for creating the decryption key 212, they will be identical.

As noted above, there are basically two levels of security. The first is the decryption algorithm depicted in FIG. 6 and the second is the reverse index way of placing the command information therein. Therefore, one needs both the encryption table and the command table at the pager in order to generate a true decrypted message. A third level of security is provided by the CRCC check byte which, even if one were to get by the decryption table and the command table, one would still have to have the CRCC information associated with that particular message. Of course, if there was an error in transmitting the particular data, the CRCC would show an error and this would not constitute a valid command. In this event, it is necessary to transmit the message a plurality of times whenever a theft is present and it is desired to disable the vehicle. In the preferred embodiment, the message will be transmitted each minute for ten minutes. Of course, once a valid signal is received, a second valid signal has no further affect on the system.

Referring now to FIGS. 7 and 8, there is illustrated a flowchart depicting the command transmission operation.

The flowchart is initialized at a function block 220 and then proceeds to a function block 222 to adjust the data rate and scan for the "cap code." The program proceeds to a decision block 224 to determine if there is a "cap code" match. As described hereinabove, the cap code is basically the address of the pager. To alleviate the need for multiple cap codes, a single cap code is provided for all pagers in the system such that they act as a single pager. The secondary address provides the discriminations between pagers in the system. If a cap code match is not found, the program flows back to a block 226 to again circulate back to function block 222. This will occur until the cap code has been received, and a match declared. The program will then flow to a function block 228 to perform Forward Error Correction (FEC) on the received data and then load the data into a buffer, this data comprising eighteen 4-bit values. The program will then flow to a function block 230, wherein the received information in the form of offset octal triplets will be converted to binary byte values. The offset octal triplet formatting will be described hereinbelow.

Once the offset octal triplets have been converted to binary byte values, the program will flow to a function block 232 in order to use the received index value, which was not enciphered, to select the masks from the encryption table 176. These will be utilized for the Modulo-2 addition in block 180 described hereinabove which utilizes an XOR mask or XOR logic function. This mask will utilize to extract the secondary address select code which is 16 bits long. The program then flows to a function block 234 to increment the index by a value of 2 and then to a function block 236 to use the index to again select additional XOR mask values from the encryption table at this new indexed value. The program will then flow to a function block 238 to perform a look-up match to extract the command information from the local command table. As noted above, this is the portion that is stored in the command field 158 with the look-up operation being a scan of the data. The program will then flow to a function block 240 to increment the index value by a factor of +1 and then flows to a function block 242 wherein the CRCC values will be decrypted utilizing the encryption table 176. Of course, the function block 238 is described hereinabove as a reverse index process wherein the location is actually inserted back into the word. Once this has occurred, the program will flow to a function block 244 wherein the entire word including the command due to the reverse indexing process will be validated with the existing CRCC. The program will then flow to a decision block 246 to determine if there is a valid message. The valid message, of course, requires that the decrypted CRCC match the remaining bits. If so, the program will flow along a "Y" path to a decision block 248 and, if not, the program will flow along an "N" path to a function block 250 to ignore the data and then back to the function block 226. If the program flows to the decision block 248, then the secondary address will be compared to the stored address of that pager. If it does not match, the program will flow along an "N" path to function block 226, and if so, the program will flow to a function block 256 to perform the decoded command and then return to function block 226. It can be seen that even though all of the information associated with the encryption and decryption operation may have been received and a valid CRCC noted, there still must be a match of the secondary address for that pager. Typically, this will not occur due to the fact that there is a separate encryption table for each pager that is a randomly generated table.

Figure 9:
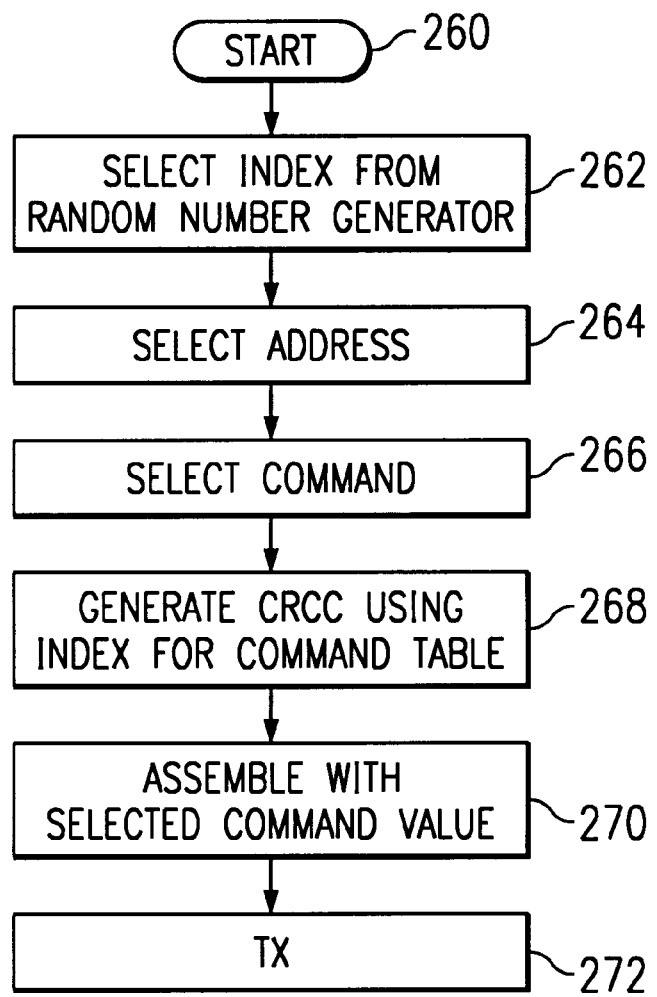
FIG. 9 illustrates a flowchart of the operation to generate the transmission.

Referring now to FIG. 9, there is illustrated a flowchart for the operation of generating the message sequence in FIG. 5.

The program is initiated at a block 260 and then proceeds to a function block 262 in order to select an index with a random number generator. The program then flows to a function block 264 to address the encryption table 150 and then to a function block 266 to select the command information that is to be inserted into the decryption table 176. This operation is basically one wherein a command is determined as being a particular index value at the pager command table. For example, the value could be "20", this representing a particular and desired command in the pager. This command value is utilized to select location "20" in the command table 152 at the central office and output a value in that command table associated with that pager. This is a randomly generated value. Of course, the location "20" in the corresponding command table 186 at the pager will also have the same randomly generated value therein. However, it is the randomly generated value that is placed into the field 158 rather than the actual location value of "20." Therefore, function block 266 indicates the operation of selecting a particular command and then selecting the associated randomly generated value in that specific and associated command table.

After the address for the encryption table 150 has been selected in function block 264 and the command has been selected in function block 266, a CRCC is generated for the word with the command, for example the command "20", inserted into the word. This is indicated by a function block 268. Thereafter, the index field 154, the secondary address field 156, and the CRCC field 168 are assembled with the command field 158 by inserting the randomly generated value associated with the command into that field 158. This is indicated by a function block 270. The program then flows to a function block 272 in order to transmit the newly assembled and encrypted command.

Figure 10:
FIG. 10 illustrates a diagrammatic view of the offset octal operation.

Referring now to FIG. 10, there is illustrated a diagrammatic view of the offset octal formatting. In general, each paging message is operable to generate a plurality of address and data packets. The address, of course, is that associated with the cap code. The message portion following will be any number of bits associated with the message, this being determined by the paging system. However, it is noted that almost all paging systems will be able to transmit a value associated with numbers from 0 through 9, this associated with a conventional telephonic keypad. As such, the 8-bit value is divided into three portions, a first 3-bit portion, a second 3-bit portion and a third 2-bit portion. Therefore, the 8-bit binary number "11111111", which has a hexadecimal value of FFh will be encoded as the octal triplet "377" (left to right), since the first triplet of "111" has an octal value of "7", the second octal triplet of "111" has a value of "7" and the third octal value of "11" will have a value of "3." This requires merely generating the value of "7", followed by the value of "7" and followed by the value of "3." Each of these separate portions of the triplet are restricted to being only those values that can be generated by a telephonic keypad. It is noted that all that is necessary in the diagram of FIG. 10 is that the system recognizes that when it receives bits that the first three bits of any received portion of the message be one portion of the triplet, the second portion be one portion and the third portion be one. If each packet message is four bits long, as illustrated in FIG. 10, only the first three bits are associated with the word. In the third message received, only the first two bits will be associated with a given byte. This is illustrated as being associated with the bytes noted in FIG. 10, there being two bytes noted. The "X" indicates an ignored received bit.

In summary, there has been provided an anti-theft system that utilizes a pager for receiving a disabling signal. In order to ensure the liability of the received signal and to ensure that it does not "false trigger", a relatively elaborate encryption/ decryption algorithm is employed. This utilizes at least three levels of encryption. The first level utilizes a randomly generated table for each pager that is stored at both the central office and at the vehicle. By utilizing a Modulo-2 addition encryption algorithm with that key table, the received data need only be compared with a key table at the receiving location with the Modulo-2 addition to decrypt the data. Also, a command embedded within the message is further encrypted with the use of command tables at each of the central office and the receiving location at the vehicle to be disabled. These command tables allow information other than the actual command itself to be transmitted, this being a random number that has no correlation to the actual command. A third level is provided by placing an error checking byte value at the end of the message which, after being decrypted, is compared to the decrypted words to determine if there is a correlation. If no correlation is present, this is invalid.

Although the preferred embodiment has been described in detail, it should be understood that various changes, substitutions and alterations can be made therein without departing from the spirit and scope of the invention as defined by the appended claims.

What is claimed:

1. A vehicle anti-theft system for allowing a user to disable a vehicle, comprising:
   a wireless transmitter locatable remote from the vehicle and operable to transmit one of a plurality of disable commands;
   a wireless receiver fixedly disposed on the vehicle for receiving the transmitted disable command and generating a control signal in response thereto; and
   a command first interpreter for carrying out the received command in response to the generation of said control signal;
   said wireless transmitter including:
      a transmitter encryption table for containing encryption key information unique to the vehicle,
      an indexer operable to generate an index value that defines a portion of said encryption table to be transmitted as a transmit key,
      an address generator for generating an address associated with said transmitter encryption table for the associated vehicle,
      a command generator for generating one of the plurality of commands,
      a Modulo 2 addition device for encrypting said address and said generated command as encrypted data utilizing said transmit key, and
      said transmitter operable to transmit said unencrypted index followed by said encrypted data;
   said receiver including:
      a receiver encryption table substantially identical to said transmitter encryption table,
      a Modulo 2 device for decrypting the received encrypted data utilizing the output of said receiver encryption table,
      a receiver indexer for receiving said unencrypted index from said transmitter and extracting a portion of said receiver encryption table substantially similar to the portion of said transmitter encryption table utilized to generate said transmit key for input to said Modulo 2 device,
      a command second interpreter for executing said decrypted command,
      an address comparison device for comparing said decrypted address with a locally stored address value that is unique to the vehicle associated with said receiver, and
      said command second interpreter activated whenever said decrypted address corresponds to said fixed local address.

2. The vehicle anti-theft system of claim 1, wherein:
   said transmitter further includes a CRCC device for performing a cyclical redundancy check operation on said transmitted data prior to encryption thereof to generate CRCC check bit values associated with the data to be encrypted and adding said generated CRCC check bit values to the said data to be encrypted prior to encryption such that said CRCC check bit values constitute a portion of the data to be encrypted; and
   said receiver including a CRCC decoder for determining if said CRCC check bits in said decrypted data correspond to the data portion thereof and, if not, then inhibiting said disable device from operating.

3. The vehicle anti-theft system of claim 2, wherein said command interpreter comprises:
   a transmitter command table unique to the vehicle for storing a plurality of random numbers and wherein said command comprises a value that is associated with a location in said transmitter command table and wherein the data to be encrypted has the CRCC check bit values determined by said CRCC device prior to encrypting and then said command is replaced by the random numbers associated with the location corresponding to said command in said transmitter command table;
   said receiver including:
      a receiver command table substantially identical to the transmitter command table for said associated vehicle,
      a location device for comparing the decrypted command field with the contents of said receiver command table and determining the command that said decrypted command field corresponds to and inserting said determined command into said command field prior to processing by said CRCC decoder.

4. The anti-theft system of claim 1, wherein said indexer comprises a random number generator for generating the index value randomly from a group of allowable values.

* * * * *